US012587852B2

(12) United States Patent
Song et al.

(10) Patent No.: US 12,587,852 B2
(45) Date of Patent: Mar. 24, 2026

(54) METHOD AND APPARATUS FOR MANAGING LICENSES FOR DATA IN M2M SYSTEM

(71) Applicants: Hyundai Motor Company, Seoul (KR); Kia Corporation, Seoul (KR); Industry Academy Cooperation Foundation of Sejong University, Seoul (KR)

(72) Inventors: Jae Seung Song, Seoul (KR); Min Byeong Lee, Hwaseong (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 168 days.

(21) Appl. No.: 17/797,058

(22) PCT Filed: Feb. 22, 2021

(86) PCT No.: PCT/KR2021/002205
§ 371 (c)(1),
(2) Date: Aug. 2, 2022

(87) PCT Pub. No.: WO2021/172835
PCT Pub. Date: Sep. 2, 2021

(65) Prior Publication Data
US 2023/0076892 A1      Mar. 9, 2023

Related U.S. Application Data

(60) Provisional application No. 63/022,879, filed on May 11, 2020, provisional application No. 62/982,175, filed on Feb. 27, 2020.

(51) Int. Cl.
| H04W 12/08 | (2021.01) |
| G06F 21/10 | (2013.01) |
| H04L 67/12 | (2022.01) |

(52) U.S. Cl.
CPC .......... *H04W 12/08* (2013.01); *G06F 21/105* (2013.01); *H04L 67/12* (2013.01); *G06F 21/1073* (2023.08)

(58) Field of Classification Search
CPC ... G06F 21/105; G06F 21/1073; G06F 21/121
See application file for complete search history.

(56) References Cited

U.S. PATENT DOCUMENTS 9,509,703 B1    11/2016  Martin et al.
2008/0066181 A1*  3/2008  Haveson ............ H04N 21/8355
                                                 726/26
(Continued)

FOREIGN PATENT DOCUMENTS

KR        2007-0100580 A    10/2007
KR        2009-0051181 A     5/2009
(Continued)

*Primary Examiner* — Dao Q Ho
(74) *Attorney, Agent, or Firm* — Fox Rothschild LLP

(57) ABSTRACT

The present invention relates to a method for managing a license of data in a machine-to-machine (M2M) system. A method for operating a M2M device in an M2M system includes: receiving data from a counterpart M2M device; receiving information on a license of the data from the counterpart M2M device; and performing an operation for the data based on the information on the license.

10 Claims, 8 Drawing Sheets

(56)                    References Cited

U.S. PATENT DOCUMENTS

| | | | |
|---|---|---|---|
| 2008/0256646 | A1 | 10/2008 | Strom et al. |
| 2009/0063350 | A1* | 3/2009 | Briggs .................... H04L 63/10 |
| | | | 705/59 |
| 2014/0164520 | A1* | 6/2014 | Fan ......................... H04W 4/50 |
| | | | 709/204 |
| 2017/0357785 | A1* | 12/2017 | Kim ..................... H04L 9/0894 |
| 2020/0394282 | A1* | 12/2020 | Wang ................... G06F 21/105 |

FOREIGN PATENT DOCUMENTS

| | | | |
|---|---|---|---|
| KR | 2014-0046487 | A | 4/2014 |
| WO | 2008/157732 | A2 | 12/2008 |
| WO | 2016/064235 | A2 | 4/2016 |

* cited by examiner

METHOD AND APPARATUS FOR MANAGING LICENSES FOR DATA IN M2M SYSTEM

CROSS-REFERENCE TO RELATED APPLICATION(S)

This application is a U.S. national stage application under 35 USC § 371 of International Application No. PCT/KR2021/002205, filed Feb. 22, 2021, claiming priority to U.S. Application No. 62/982,175, filed Feb. 27, 2020 and priority to U.S. Application No. 63/022,879, filed May 11, 2020, each of which is incorporated by reference in its entirety into this application.

BACKGROUND OF THE INVENTION

Field of the Invention

The present invention relates to a method and apparatus for managing a license of data in a machine-to-machine (M2M) system. More particularly, the present invention relates to a method and apparatus for performing an operation for adding information on a license to data and managing the license of data in an M2M system.

Description of the Related Art

Recently, introduction of Machine-to-Machine (M2M) system has become active. An M2M communication may refer to a communication performed between machines without human intervention. M2M may refer to Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present invention is directed to provide a method and apparatus for effectively managing a license of data in a machine-to-machine (M2M) system.

The present invention is directed to provide a method and apparatus for transferring license information of data to a counterpart M2M device in an M2M system.

The present invention is directed to provide a method and apparatus for checking whether or not it is possible to perform an operation for data and whether or not there is a right, based on a license of the data before performing the operation in an M2M system.

According to an embodiment of the present invention, a method for operating a machine-to-machine (M2M) device in an M2M system includes: receiving data from a counterpart M2M device; receiving information on a license of the data from the counterpart M2M device; and performing an operation for the data based on the information on the license.

According to an embodiment of the present invention, a method for operating a machine-to-machine (M2M) device in an M2M system includes: performing an operation for data; transmitting the data to a counterpart M2M device; transmitting information on a license for the data to the counterpart M2M device; transmitting a retrieval request message for the license of the data to the counterpart M2M device; and receiving a retrieval response message for the retrieval request message from the counterpart M2M device.

According to an embodiment of the present invention, a machine-to-machine (M2M) device in an M2M system includes a transceiver configured to transmit and receive a signal and a processor configured to control the transceiver, wherein the processor is further configured to: receive data from a counterpart M2M device, receive information on a license for the data from the counterpart M2M device, and perform an operation for the data based on the information on the license.

According to the present disclosure, it is possible to manage data according to a license condition added to the data in a machine-to-machine (M2M) system.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
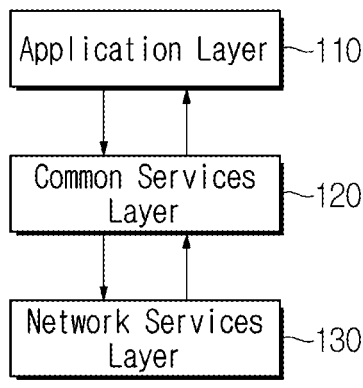
FIG. 1 illustrates a layered structure of a machine-to-machine (M2M) system according to the present disclosure.

Hereinafter, exemplary embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various exemplary embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. An M2M server refers to a server for M2M communication and may be a fixed station or a mobile station. In the present specification, an entity may refer to hardware like M2M device, M2M gateway and M2M server. In addition, for example, an entity may be used to refer to software configuration in a layered structure of M2M system and is not limited to the embodiment described above.

In addition, for example, the present disclosure mainly describes an M2M system but is not solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

oneM2M is a de facto standards organization that was founded to develop a communal IoT service platform sharing and integrating application service infrastructure (platform) environments beyond fragmented service platform development structures limited to separate industries like energy, transportation, national defense and public service. oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of an Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 120 may be a network service entity (NSE).

Figure 2:
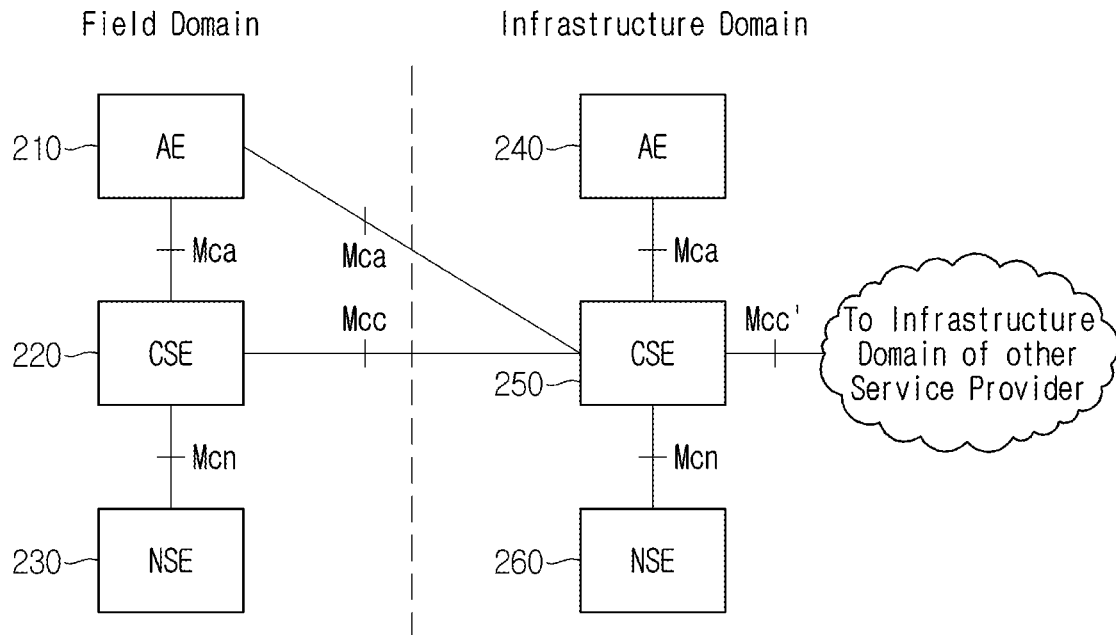
FIG. 2 illustrates a reference point in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
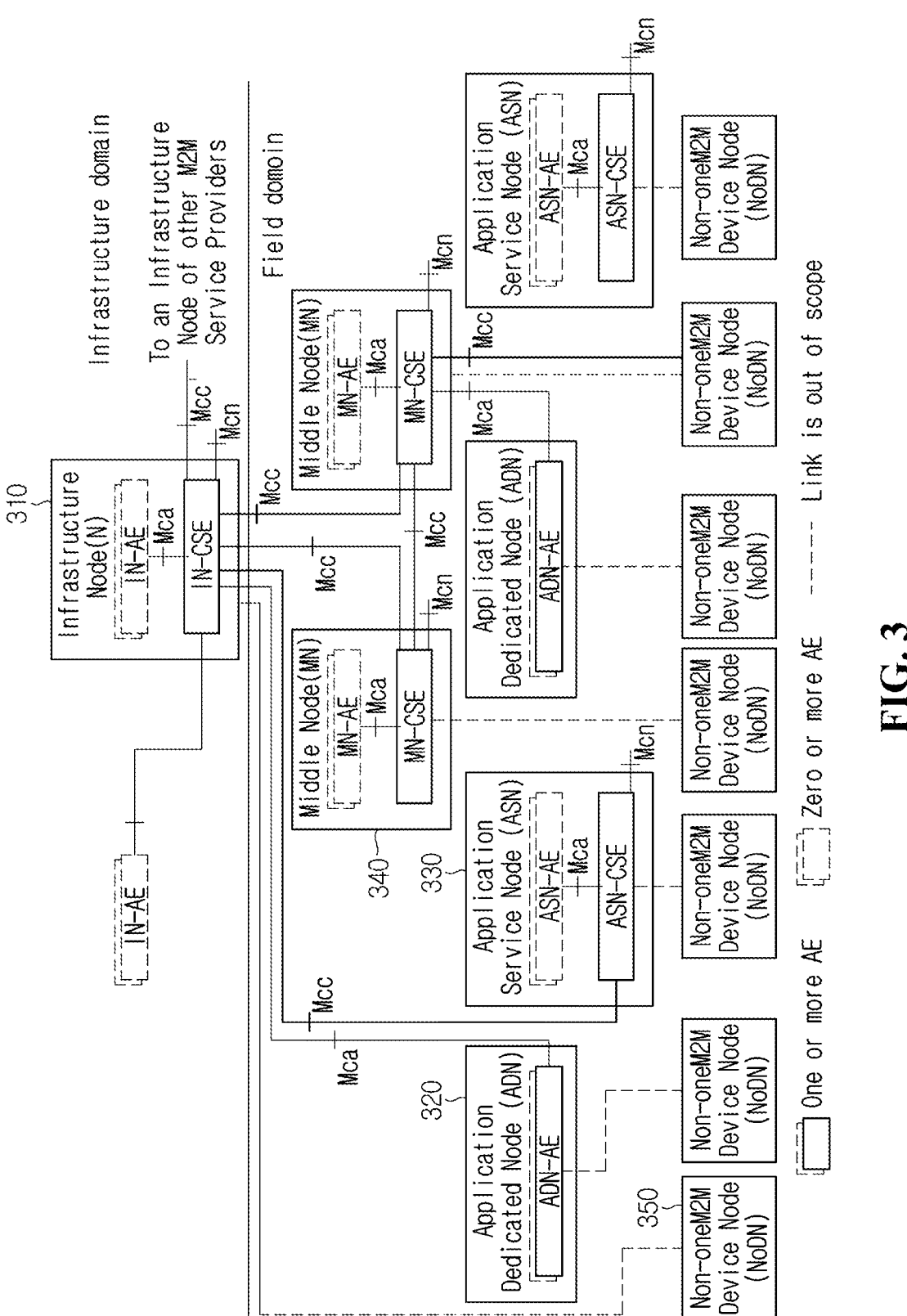
FIG. 3 illustrates each node in an M2M system according to the present disclosure.

FIG. 3 is a view illustrating each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
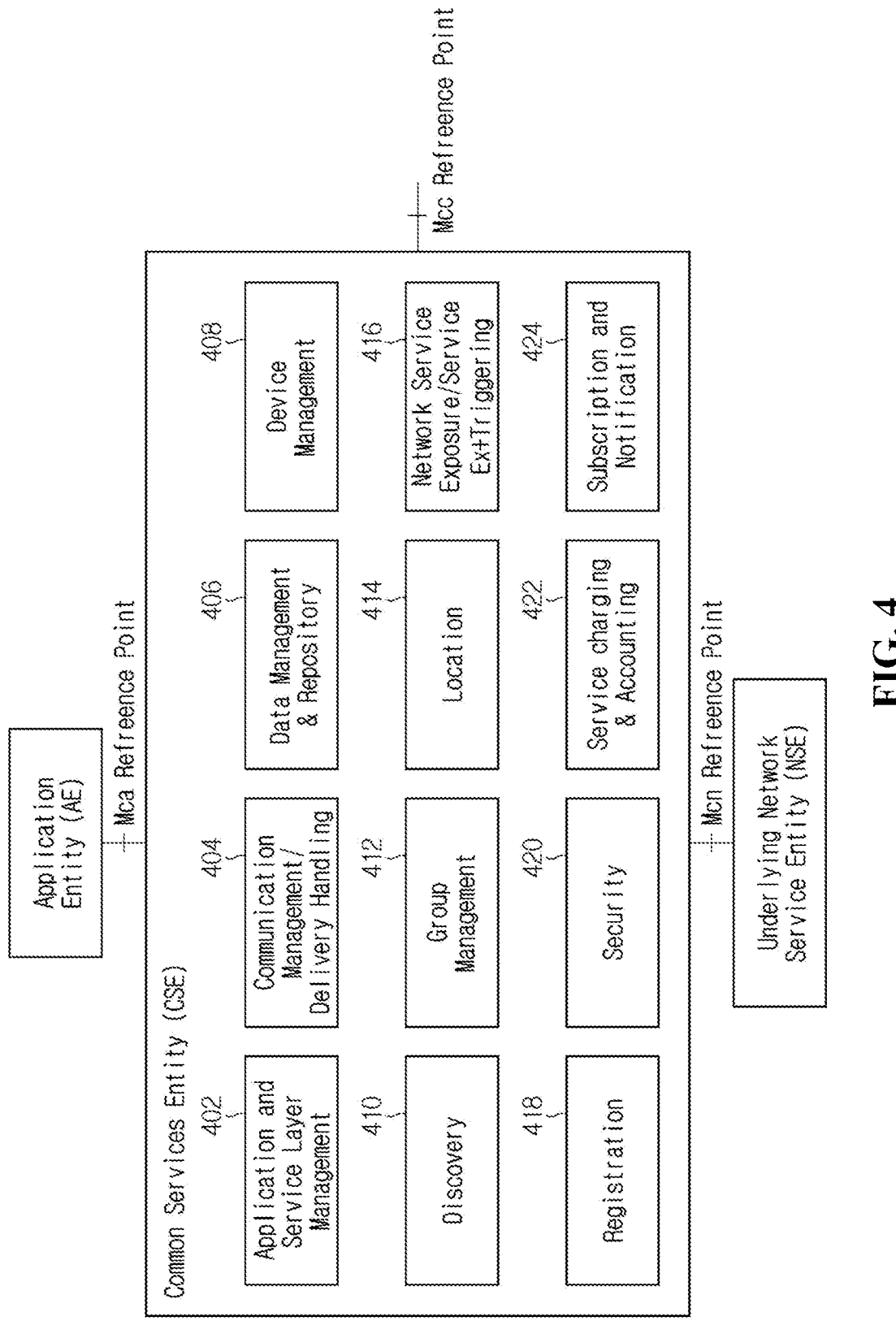
FIG. 4 illustrates a common service function in an M2M system according to the present disclosure.

FIG. 4 is a view illustrating a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF are configured to determine at what time and through what connection communications are to be delivered, and also determine to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF is configured to provide an information retrieval function for applications and services based on filter criteria. The group management 412 CSF provides processing of group-related requests. The group management 412 CSF enables an M2M system to support bulk operations for many devices and applications. The location 414 CSF is configured to enable AEs to obtain geographical location information.

The network service exposure/service execution and triggering 416 CSF manages communications with base networks for access to network service functions. The registration 418 CSF is configured to provide AEs (or other remote CSEs) to a CSE. The registration 418 CSF allows AEs (or remote CSE) to use services of CSE. The security 420 CSF is configured to provide a service layer with security functions like access control including identification, authentication and permission. The service charging and accounting 422 CSF is configured to provide charging functions for a service layer. The subscription/notification 424 CSF is configured to allow subscription to an event and notifying the occurrence of the event.

Figure 5:
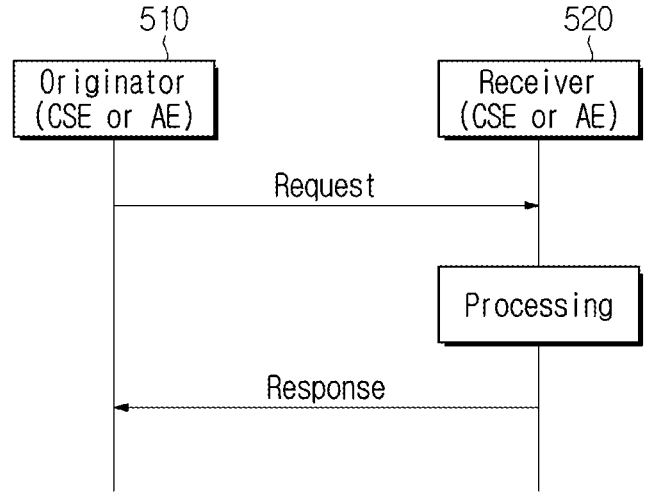
FIG. 5 illustrates a method in which an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete and Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

| Response message parameter/success or not |
| --- |
| Response Status Code - successful, unsuccessful, ack |
| Request Identifier - uniquely identifies a Request message |
| Content - to be transferred |
| To - the identifier of the Originator or the Transit CSE that sent the corresponding non-blocking request |
| From - the identifier of the Receiver |
| Originating Timestamp - when the message was built |
| Result Expiration Timestamp - when the message expires |
| Event Category - what event category shall be used for the response message |
| Content Status |
| Content Offset |

TABLE 1-continued

| Response message parameter/success or not |
| --- |
| Token Request Information |
| Assigned Token Identifiers |
| Authorization Signature Request Information |
| Release Version Indicator - the oneM2M release version that this response message conforms to |

A filter criteria condition, which can be used in a request message or a response message, may be defined as in Table 2 and Table 3 below.

TABLE 2

| Condition tag | Multi-plicity | Description |
| --- | --- | --- |
| | | Matching Conditions |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value 1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3] |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |

TABLE 2-continued

| Condition tag | Multi-plicity | Description |
|---|---|---|
| size Above | 0 . . . 1 | The contentsize attribute of the <contentInstance> matched resource is equal to or greater than the specified value. |
| sizeBelow | 0 . . . 1 | The contentsize attribute of the <contentInstance> matched resource is smaller than the specified value. |
| contentType | 0 . . . 1 | The contentinfo attribute of the <contentInstance> matched resource matches the specified value. |
| attribute | 0 . . . 1 | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery. In the case of semantic resource discovery targeting a specific resource, if the semantic description contained in the <semanticDescriptor> of a child resource matches the semanticFilter, the URI of this child resource will be included in the semantic resource discovery result. In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28] |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multi-plicity | Description |
|---|---|---|
| | | Filter Handling Conditions |
| filterUsage | 0 . . . 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. . . /tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

| Request message parameter | |
|---|---|
| Mandatory | Operation - operation to be executed/CREAT, Retrieve, Update, Delete, Notify |
| | To - the address of the target resource on the target CSE |

TABLE 4-continued

Request message parameter

| | |
|---|---|
| | From - the identifier of the message Originator |
| | Request Identifier - uniquely identifies a Request message |
| Operation | Content - to be transferred |
| dependent | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |
| | Result Content - the expected components of the result |
| | Event Category - indicates how and when the system should deliver the message |
| | Delivery Aggregation - aggregation of requests to the same target CSE is to be used |
| | Group Request Identifier - Identifier added to the group request that is to be fanned out to each member of the group |
| | Group Request Target Members - indicates subset of members of a group |
| | Filter Criteria - conditions for filtered retrieve operation |
| | Desired Identifier Result Type - format of resource identifiers returned |
| | Token Request Indicator - indicating that the Originator may attempt Token Request procedure (for Dynamic Authorization) if initiated by the Receiver |
| | Tokens - for use in dynamic authorization |
| | Token IDs - for use in dynamic authorization |
| | Role IDs - for use in role based access control |
| | Local Token IDs - for use in dynamic authorization |
| | Authorization Signature Indicator - for use in Authorization Relationship Mapping |
| | Authorization Signature - for use in Authorization Relationship Mapping |
| | Authorization Relationship Indicator - for use in Authorization Relationship Mapping |
| | Semantic Query Indicator - for use in semantic queries |
| | Release Version Indicator - the oneM2M release version that this request message conforms to. |
| | Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Resources are specified in terms of CSE. Resources are the representations of components and elements in CSE in a oneM2M system. Application data and commands representing other CSEs, AEs, and sensors are notified as means of resource representations to a CSE.

A resource is a uniquely addressable entity in a oneM2M architecture. A resource may be delivered and be manipulated using CRUD (Create Retrieve Update Delete) operations.

A child resource is a sub-resource of another resource that is a parent resource. A parent resource includes reference for at least one child resource.

An attribute stores information associated with a resource. When a set of attributes is not common to all the resources, the set of attributes is not enumerated in a graphic representation of a resource.

Attributes are classified into universal attributes, common attributes, and resource-specific attributes. A universal attribute appears to every resource, and a common attribute appears to a plurality of resources and has a same meaning wherever it appears.

Examples of attributes, which are virtual or not declared and are general and universal to every resource type, are shown in Table 5 below.

TABLE 5

| Attribute Name | Description |
|---|---|
| resourceType | Resource Type. This Read Only (assigned at creation time, and then cannot be changed) attribute identifies the type of the resource as specified in clause 9.6. Each resource shall have a resourceType attribute. |
| resourceID | This attribute is an identifier for the resource that is used for 'non-hierarchical addressing method', i.e. this attribute shall contain the 'Unstructured-CSE-relative-Resource-ID' format of a resource ID as defined in table 7.2-1. This attribute shall be provided by the Hosting CSE when it accepts a resource creation procedure. The Hosting CSE shall assign a resourceID which is unique in that CSE. |
| resourceName | This attribute is the name for the resource that is used for 'hierarchical addressing method' to represent the parent-child relationships of resources. See clause 7.2 for more details. This attribute may be provided by the resource creator. The Hosting CSE shall use a provided resourceName as long as it does not already exist among child resources of the targeted parent resource. If the resourceName already exists, the Hosting CSE shall reject the request and return an error to the Originator. The Hosting CSE shall assign a resourceName if one is not provided by the resource creator. |
| parentID | This attribute is the resourceID of the parent of this resource. The value of this attribute shall be NULL for the <CSEBase> resource type. |
| creationTime | Time/date of creation of the resource. This attribute is mandatory for all resources and the value is assigned by the system at the time when the resource is locally created. Such an attribute cannot be changed. |
| lastModifiedTime | Last modification time/date of the resource. The lastModifiedTime value is set by the Hosting CSE when the resource is created, and the lastModifiedTime value is updated when the resource is updated. |

Examples of attributes, which are virtual or not declared and are general and commonly used in not all but multiple resource types, are shown in Table 6 below.

TABLE 6

| Attribute Name | Description |
|---|---|
| accessControl-PolicyIDs | The attribute contains a list of identifiers for <accessControlPolicy> resources. The privileges defined in the <accessControlPolicy> resources that are referenced determine who is allowed to access the resource containing this attribute for a specific purpose (e.g. Retrieve, Update, Delete, etc.).<br>For an Update or Delete operation to a resource, the update or delete of the accessControlPolicyIDs attribute, if applicable, shall be performed prior to the update or delete of any other attributes of the resource.<br>To update this attribute, a Hosting CSE shall check whether an Originator has Update privilege in any selfPrivileges, regardless of privileges, of the <accessControlPolicy> resources which this attribute originally references. After successful update of the accessControlPolicyIDs attribute, resource access checking for other attributes to be updated shall use the new privileges defined in the <accessControlPolicy> resource(s) that are referenced by the newly updated accessControlPolicyIDs attribute.<br>Similarly, to delete this attribute, a Hosting CSE shall check whether an Originator has Updateprivilege in any selfPrivileges, regardless of privileges, of the <accessControlPolicy> resources which this attribute originally references.<br>After successful deletion of the accessControlPolicyIDs attribute, resource access checking for other attributes to be deleted shall use the default access privileges as described in the following paragraphs.<br>If a resource type does not have an accessControlPolicyIDs attribute definition, then the accessControlPolicyIDs for that resource is governed in a different way, for example, the accessControlPolicy associated with the parent may apply to a child resource that does not have an accessControlPolicyIDs attribute definition, or the privileges for access are fixed by the system. Refer to the corresponding resource type definitions and procedures to see how access control is handled in such cases. If a resource type does have an accessControlPolicyIDs attribute definition, but the (optional) accessControlPolicyIDs attribute value is not set in a resource instance, then the Hosting CSE shall apply the concept of the default access policy. The default policy shall provide unrestricted access only to the Originator of the successful resource creation request. All other entities shall be denied to access the resource. For that purpose, the Hosting CSE shall keep that Originator information of the resource. Note that how to keep that information is implementation specific. The default access policy is not applied to a resource which has a value assigned to the accessControlPolicyIDs attribute.<br>All resources are accessible if and only if the privileges (i.e. configured as privileges or selfPrivileges attribute of <accessControlPolicy> resource) allow it, therefore all resources shall have an associated accessControlPolicyIDs attribute, either explicitly (setting the attribute in the resource itself) or implicitly (either by using the parent privileges or the system default policies).<br>Which means that the system shall provide default access privileges in case that the Originator does not provide a specific accessControlPolicyIDs during the creation of the resource. |
| expirationTime | Time/date after which the resource will be deleted by the Hosting CSE. This attribute can be provided by the Originator, and in such a case it will be regarded as a hint to the Hosting CSE on the |

TABLE 6-continued

| Attribute Name | Description |
|---|---|
| | lifetime of the resource. The Hosting CSE shall configure the expirationTime value. If the Hosting CSE configures the new expirationTime attribute value rather than the Originator suggested value, the new value can be sent back to the Originator depending on the Result Content value. The lifetime of the resource can be extended by providing a new value for this attribute in an UPDATE operation. Or by deleting the attribute value, e.g. by updating the attribute with NULL when doing a full UPDATE, in which case the Hosting CSE can decide on a new value.<br>If the Originator does not provide a value in the CREATE operation the system shall assign an appropriate value depending on its local policies and/or M2M service subscription agreements.<br>A resource is known as 'obsolete' when the resource contains the attribute "expirationTime" and the lifetime of this resource has reached the value of this attribute. If the 'obsolete' resource had a reference to an Application Entity Resource ID, the Hosting CSE shall send a NOTIFY request to the IN-CSE, requesting to delete the entry from the <AEContactList> resource. |
| stateTag | An incremental counter of modification on the resource. When a resource is created, this counter is set to 0, and it will be incremented on every modification of the resource (see notes 1 and 2). |
| announceTo | This attribute may be included in a CREATE or UPDATE Request in which case it contains a list of addresses/CSE-IDs where the resource is to be announced. For the case that CSE-IDs are provided, the announced-to CSE shall decide the location of the announced resources based on the rules described in clause 9.6.26. For the original resource, this attribute shall only be present if it has been successfully announced to other CSEs. This attribute maintains the list of the resource addresses to the successfully announced resources. Updates on this attribute will trigger new resource announcement or de-announcement.<br>If announceTo attribute includes resource address(s), the present document does not provide any means for validating these address(s) for announcement purposes. It is the responsibility of the Hosting-CSE referenced by the resource address(s) to validate the access privileges of the originator of the Request that triggers the announcement. |
| announcedAttribute | This attribute shall only be present at the original resource if some Optional Announced (OA) type attributes have been announced to other CSEs. This attribute maintains the list of the announced Optional Attributes (OA type attributes) in the original resource.<br>Updates to this attribute will trigger new attribute announcement if a new attribute is added or de-announcement if the existing attribute is removed. |
| labels | Tokens used to add meta-information to resources. This attribute is optional.<br>The value of the labels attribute is a list of individual labels, each of them being:<br>Either a standalone label-key, used as a simple "tag", that can be used for example for discovery purposes when looking for particular resources that one can "tag" using that label-key<br>Or a composite element made of a label-key and a label-value, separated by a special character defined in [3].<br>The list of allowed characters in a label (and in label-keys and label-values) and separator characters is defined in [3], clause 6.3.3. |
| e2eSecInfo | Present in a resource representing an AE or CSE. Indicates the end-to-end security capabilities supported by the AE or CSE. May indicate supported end-to-end security frameworks. May also contains a certificate or credential identifier |

TABLE 6-continued

| Attribute Name | Description |
| --- | --- |
| | used by the AE or CSE. May include random values for use in end-to-end security protocols. The details of this attributes are described in oneM2M TS-0003 [2].This attribute is optional and if not present it means that the represented entity does not support oneM2M end-to-end security procedures. |
| Dynamic Authorization ConsultationIDs | This attribute contains a list of identifiers of <dynamicAuthorizationConsultation> resources. The information defined in a <dynamicAuthorizationConsultation> resource is used by a CSE for initiating consultation-based dynamic authorization requests. Consultation-based dynamic authorization is only performed for a targeted resource if and only if it is linked to an enabled <dynamicAuthorizationConsultation> resource. If the attribute is not set or has a value that does not correspond to a valid <dynamicAuthorizationConsultation> resource(s), or it refers to an <dynamicAuthorizationConsultation> resource(s) that is not reachable, then the dynamicAuthorizationConsultationIDs associated with the parent may apply to the child resource if present, or a system default <dynamicAuthorizationConsultation> may apply if present. |

A current oneM2M system specifies an access control policy (ACP) which is a policy to control the access of data. However, ACP only checks the access right of a target resource. Accordingly, in a conventional oneM2M system, there is no way to check the license of data and to control data usage based on the license. Therefore, the present disclosure proposes a method of managing and performing an operation for data by using a license in a oneM2M system.

According to an embodiment, an M2M2 system may manage a license of data by using a creative commons license (CCL).

In order to manage the copyright of a digital content, a CCL permits a user to freely use a work, imposes a predetermined scope of restrictions according to the intention of a copyright holder and defines items to display the restrictions. A CCL is a license permitting usage of its work under a predetermined condition.

Using a CCL, a creator can determine conditions to apply to a work, and such conditions to apply a work may be described as follows.

Attribution(by): All CCLs require that others who use a creator's work should give the creator credit the way the creator requests, but not in a way that suggests the creator endorse them or their use. The creator lets others copy, distribute, exhibit and perform only original copies of the creator's work. If others want to use the creator's work without giving the creator credit or for endorsement purposes, they must get the creator's permission first.

ShareAlike(sa): A creator lets others copy, distribute, display, perform, and modify the creator's work. Herein, a modified work may be distributed under the same terms. When others want to distribute modified works under other terms, they should get the creator's permission first.

NonCommercial(nc): A creator lets others copy, distribute, display, perform, and modify the creator's work. Herein, when they do not get the creator's permission first, they can copy, distribute, display, perform and modify the work for any purpose other than commercially.

NoDerivatives(nd): A creator lets others copy, distribute, display and perform only original copies of the creator's work. When they want to modify the creator's work, they should get the creator's permission first.

CC(creative commons) offers the following copyright licenses based on combinations of CCL conditions. The copyright licenses offered by CC may be described as follows.

Attribution(CC BY): CC BY license lets others copy, distribute, display and perform a creator's work under the condition that they credit the creator to the original creation.

Attribution-ShareAlike (CC BY-SA): CC BY-SA license lets others copy, distribute, display and perform a work, for either commercial or non-commercial purposes, under the conditions that they credit a creator to the original creation and the same license terms apply to modified works.

Attribution-NoDerivatives (CC BY-ND): CC BY-ND license lets others use a work for either commercial or non-commercial purposes under the condition that they credit a creator to the original creation, but imposes restrictions on modified works.

Attribution-NonCommercial (CC BY-NC): CC BY-NC license lets others copy, distribute, display and perform a work for non-commercial purposes under the condition that they credit a creator to the original creation.

Attribution-NonCommercial-ShareAlike (CC BY-NC-SA): CC BY-NC-SA license lets others modify and use a work for non-commercial purposes under the condition that they credit a creator to the original creation and the same license is applied.

Attribution-NonCommercial-NoDerivs (CC BY-NC-ND): CC-BY-NC-ND license is the most restrictive license among the licenses defined by CCL and lets others share a work but imposes restrictions on modification and commercial use of the work.

No Right Reserved (CC0): As opposed to CC license which lets creators maintain their copyright and select one of various licenses, CC0 can give creators choice as an alternative to copyright and/or protection of database and other exclusive rights naturally given to creators.

CC0 license enables creators to waive rights of their works (e.g., copyright- or database-protected contents) and may declare that the works are in public domain. Accordingly, others are allowed to use such works for any purposes without restriction under copyright and database laws.

For example, the European digital library uses CC0 license to open meta data in public domains. Data of digitized cultural art works are present and open in public domains.

Accordingly, the present disclosure proposes a method for giving attributes about a license to data and for managing the license of data. According to an embodiment of the present disclosure, <dataLicense>, which is an attribute about a license of data, may be given to data.

In order to indicate a license of data, <dataLicense> attribute, which indicates a license in Table 7, may be added.

TABLE 7

| Value | Description |
| --- | --- |
| CC BY | This license lets others distribute, remix, tweak, and build upon specified resource(s), even commercially, as long as they credit the owner of resource(s) for the original creation. |
| CC BY-SA | This license lets others remix, tweak, and build upon specified resource(s) work even for commercial purposes, as long as they credit the owner of resource(s) |

TABLE 7-continued

| Value | Description |
|---|---|
| | and license their new creations under the identical terms. |
| CC BY-ND | This license lets others reuse the specified resource for any purpose, including commercially; however, it cannot be shared with others in adapted form, and credit must be provided to the owner of the resource(s). |
| CC BY-NC | This license lets others remix, tweak, and build upon the specified resource non-commercially, and although their new resources must also acknowledge the owner of the resource and be non-commercial, they don't have to license their derivative works on the same terms. |
| CC BY-NC-SA | This license lets others remix, tweak, and build upon the specified resource(s) non-commercially, as long as they credit the owner of the resource and license their new creations under the identical terms. |
| CC BY-NC-ND | This license only allows others to retrieve the specified resource(s) and share them with others as long as they credit the owner of the resource(s), but they can't change the contents of the resource(s) in any way or use them commercially. |
| CC0 | No copyright |

According to an embodiment of the present disclosure, in order to link IoT data to other available data in an M2M system, it is important to retrieve open data only under CC-BY or CC0 licenses. Whenever data under CC-BY SA is transferred to another M2M device or platform to be used for other purposes, the same license should be applied at the target IoT platform. Alternatively, based on service level agreement with an IoT platform service provider, the same license should be applied at the target IoT platform.

According to an embodiment, in order to manage a license of data, <dataCreator> attribute indicating a creator of data and <dataOwner> attribute indicating an owner of data may be used.

According to another embodiment, an M2M system may manage a license of data by using open database commons. The open database commons may provide a useful legal means and a license to let a user display, provide and use open data. The open database commons may provide three licenses.

Open Data Commons Open Database License (ODbL): ODbL may let a user freely share, modify and use a database. In addition, ODbL is a copyleft license.

Open Data Commons Attribution License (ODC-BY): ODC-BY license is a license indicating that data of a database belongs to a specific database.

Open Data Commons Public Domain Dedication and License (PDDL): PDDL is a license which uses databases and contents exclusively in public domains so that every user can use data free of charge.

For example, OpenStreetMap is open data which OpenStreetMap Foundation gives a license according to ODbL. Accordingly, when a data user recognizes OpenStreetMap Foundation and a contributor, the user may copy, distribute, transfer and adapt OpenStreetMap data.

According to another embodiment, an M2M system may manage a license of data by using a proprietary data license. A data license is a legal contract specifying a series of terms regarding usage of data. When data is displayed in a (open or closed) data storage, an owner of the data (or dataset) should define a license for the data. There are existing data license systems that are publicly known, and the data license systems include basic requirements to share data with users. However, depending on the type and circumstance of a dataset, the owner may designate a proprietary data license system. Such a proprietary data license system may include basic terms like users using license data and a data sharing purpose.

A data license system includes a variety of information and hence M2M devices cannot generalize and model all the license systems. Instead, an IoT platform should provide a means of storing a data license system and opening data according to the data license system.

M2M devices selects one of available license standards and generates attributes containing license information of data based on the selected standard. Herein, when existing license standards do not satisfy a user's requirement, the user may set a separate license standard. The separate license standard may be defined to include essential information on the license of data. An embodiment of essential information necessary to set a data license standard may include at least one of the items shown in Table 8.

TABLE 8

| Information | Description |
|---|---|
| User of licensed data | The data license scheme should specify who is permitted to use the licensed data. |
| Exclusivity | This is required when a licensee requires an exclusive license to the data. In this case, this information grants rights to the data to the licensee, not allows use or access by other parties, including the licensor. |
| Sole license | If a licensee does not want the data to be licensed to other 3rd parties, but to allow the licensor to continue to access and use the data, a sole license should be mentioned in the data license. |
| Purpose | In some cases, data is needed to be licensed for a purpose and only for that purpose. |
| Location | This information is to specify where the data can be stored, accessed, and used. For example, a license for EU citizens' healthcare data may limit storage, access, and use of healthcare data from EU citizens to EU. |
| Privacy and security | Considering strong privacy and security related regulations (e.g., GDPR and PIPA), it is important to address in the data license sentences that the licensee is obligated to take to protect the data and the licensee's potential liability if a data breach occurs. |
| Quality | If licensors want to disclaim any representation or warranty with respect to the completeness, accuracy, timeliness of the licensed data, a licensee need to specify such intention to the data license. For example, the following disclaimer can be used for a licensor if the licensor is not in the business of licensing the specific type of data: "The data is licensed 'as is' and 'as available' and the licensor does not assume any responsibility for the use of the licensed data" |
| Rights | It is important for licensees to satisfy through the license agreement that the licensor possesses and is able to grant the licensee all of the rights the licensee requires to use the data for the anticipated purposes. |
| Termination | Often, data is licensed for a limited subscription term. After the subscription term, licensed data will be returned or destroyed. |

An operation of M2M devices exchanging data containing an attribute about a license may be described as follows.

Figure 6:
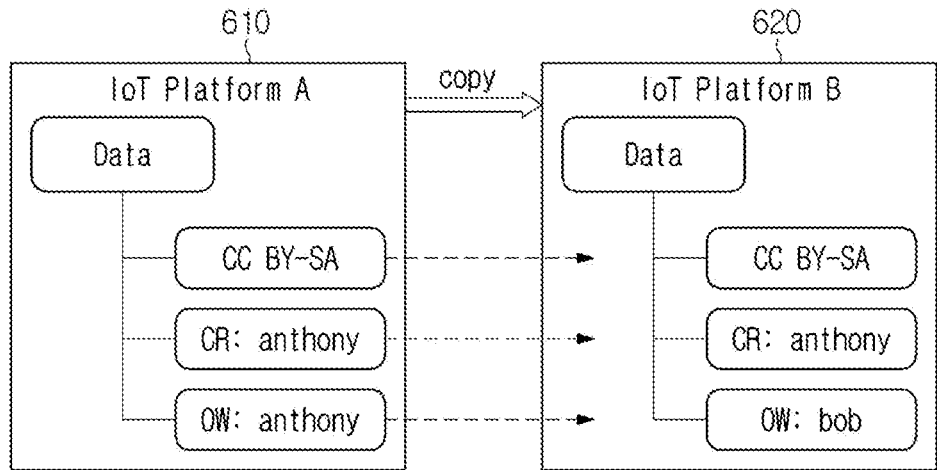
FIG. 6 is a conceptual diagram illustrating M2M devices which exchange data containing attributes related to a license.

FIG. 6 is a conceptual diagram illustrating M2M devices which exchange data containing attributes related to a license.

Referring to FIG. 6, IoT platforms 610 and 620 may exchange data containing attributes about a license with each other. Herein, each of the IoT platforms 610 and 620 may be understood as a single M2M device or a set of two or more M2M devices.

When creating data or a resource, the platform A 610 may add an attribute about a license of data. Herein, information on the license may be information indicating at least one of a license type of the data, a creator (CR) (anthony according to FIG. 6), and an owner (OW) of the data (anthony according to FIG. 6). According to the embodiment of FIG. 6, the license type of data is CC BY-SA.

When a license permits data to be copied, the platform A 610 may copy the data and transmit copied data to the platform B 620. The platform B 620 may perform an operation associated with the data, which is permitted by the license. In addition, the platform B 620 may set a license of received data according to received license information. For example, when CC BY-SA license is given to data and the data is copied into the platform B 620, the platform B 620 gives the same CC BY-SA license to copied data. In addition, the platform B 620 may set the creator of the data as anthony. In addition, the platform B 620 may modify information indicating the owner of data among pieces of information on license. That is, the platform B 620 may modify the OW attribute from anthony to bob.

In order to indicate and manage a license of data, as described above, at least one of <dataLicense> attribute, <dataCreator> attribute and <dataOwner> attribute may be added to every resource. When a data group is managed under a same license, at least one of <dataLicense> attribute, <dataCreator> attribute and <dataOwner> attribute may be added to a group resource.

In addition, the conventional oneM2M system has the following vulnerability associated with a license of data. For example, there is no way to add license information to data or a dataset. In addition, there is no way to check whether or not copied data is data that has been copied appropriately according to a given license. In addition, there is no way to manage validity of a license, and there is no way to exchange information on a license in sharing data.

Various scenarios suggesting a reason why an oneM2M system should support a data license may be described as follows.

Scenario 1: An IoT application may retrieve smart parking and traffic data according to 'CC-BY' license in order to provide a smart parking service, which is a commercial service. Accordingly, the application should use data that can be freely modified as long as a data owner is given a credit.

Scenario 2: An IoT application creates a lot of smart city data. Herein, since the application is developed and operated by the government, the government may open data created by the application to users. However, when the government intends to permit only non-commercial use of the data, the government may apply 'CC-BY-NC' license to the data.

Therefore, the present disclosure proposes a method of adding functions of managing information on a license of data in a oneM2M system. A separate attribute indicating necessary information for managing a license may be added to an existing resource or a <dataLicense> resource which is a resource for managing a license of data. The information indicated by the separate attribute may include at least one of the items listed below.

Terms of data license: The attribute of terms of data license may include header and/or copyright statements that come with the data.

ACK (acknowledgement the source of data): The ACK attribute for data source may include statements specified by data and/or an information provider. In addition, if possible, the ACK attribute for data source may provide a link for indicating a source of data, an address of the resource of data, and/or a web page of the resource of data.

Types of data license: The data license type attribute may indicate a type of a license applied to data.

Creation date of data license: The data license creation data attribute may indicate a creation date of a license applied to data.

Expiration of data license: The data license expiration attribute may indicate an expiration time of a license applied to data.

Provider of data: The data provider attribute may indicate a provider of data.

Creator of data: The data creator attribute may indicate a creator of data.

Eligibility of using data: The data usage eligibility attribute may indicate information on a specific user or group of which the usage of data is restrictively permitted by a data provider.

Modification of data: The data modification attribute may indicate whether or not data is modified.

*155 Original source of data: The original data source attribute may indicate a link to an original data set.

Original source of data license: The original data license source attribute may indicate a link to an original license of data.

Available operations: This is an attribute that indicates a type of available operations for a given dataset, and the available operations may be at least one operation of Modify, Copy, Publish, Translate, Adapt and Distribute.

Data user: The data user attribute is an attribute that indicates information on a platform or a user using a dataset and may be an optional attribute.

The present disclosure proposes a method of adding attributes for managing a license of data to an existing resource or a separate data license management resource which is a new resource created for managing a license. In an M2M system, various data license management resources may be created. In addition, data and/or a dataset may indicate a single data license management resource. A resource present in an M2M system may have a data license link attribute indicating a referred data license management resource. Embodiments of an operation of M2M devices, which manage licenses by using attributes for managing data licenses, may be described as follows.

Figure 7:
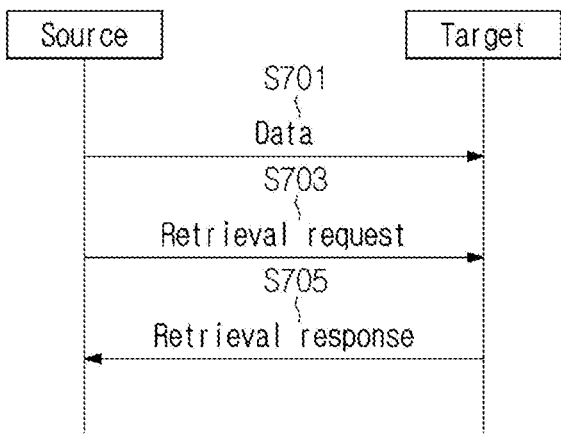
FIG. 7 is a flowchart illustrating a first embodiment of an operation of M2M devices which perform an operation for data based on an attribute related to a license.

FIG. 7 is a flowchart illustrating a first embodiment of an operation of M2M devices which perform an operation for data based on an attribute related to a license.

In an M2M network of FIG. 7, a source M2M device and a target M2M device may exchange data. In addition, the source M2M device may check whether or not the target M2M device uses correct data.

Referring to FIG. 7, at step S701, the source M2M device may transfer data to the target M2M device. The data transferred by the source M2M device may be copied data. In addition, the source M2M device may transfer attributes associated with a license for data to the target M2M device. Herein, an attribute associated with a license for data may indicate information on a source of data, a license of data and the like.

At step S703, the source M2M device may request the target M2M device to retrieve a license for the transferred data. In order to check whether or not the target M2M device uses correct data, the source M2M device may request the target M2M device to provide attributes about a license of the transferred data.

According to an embodiment, the source M2M device may operate a time after transferring the data and may request a license retrieval after the timer expires. Alternatively, according to another embodiment, when the source M2M device detects the data usage of the target M2M device, the source M2M device may request license retrieval for data of the target M2M device. In order to check whether or not the target M2M device uses correct data, the source M2M device may request the target M2M device to provide attributes about a license of the transferred data.

At step S705, the target M2M device may transmit a retrieval response message for the retrieval request to the source M2M device. The retrieval response message may include an attribute about a license of data received from the source M2M device, more particularly, including a data source, ACK for the data source, and license information of data in the target M2M device. The source M2M device may receive the retrieval response message and obtain attributes about a data license of the target M2M device included in the retrieval response message.

Next, although not illustrated in FIG. 7, the source M2M device may check whether or not the target M2M device modifies an attribute about a license of data. Specifically, the source M2M device may detect whether or not a license-related attribute of unmodifiable data based on a license. When detecting modification of the license-related attribute of unmodifiable data, the source M2M device may recognize the data usage of the target M2M device as incorrect usage of data. Accordingly, the source M2M device may check whether or not the target M2M device uses correct data.

Figure 8:
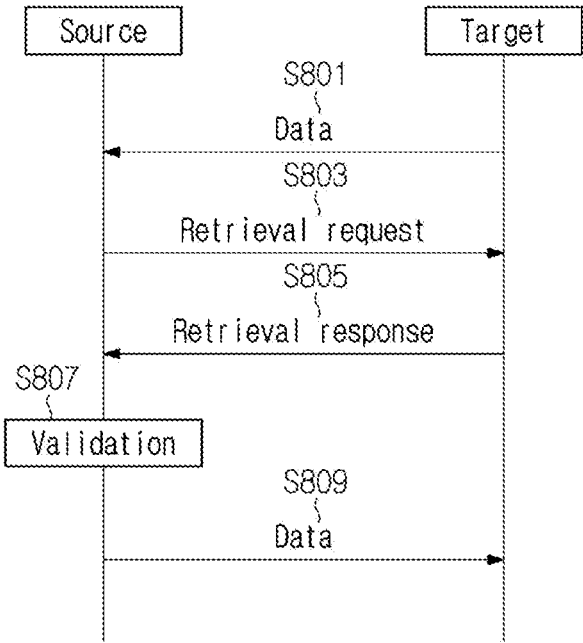
FIG. 8 is a flowchart illustrating a second embodiment of an operation of M2M devices which perform an operation for data based on an attribute related to a license.

FIG. 8 is a flowchart illustrating a second embodiment of an operation of M2M devices which perform an operation for data based on an attribute related to a license.

In an M2M network of FIG. 8, a source M2M device and a target M2M device may exchange data, and the target M2M device may create a resource for managing a license of data. The source M2M device may check whether or not the target M2M device uses correct data. In addition, by checking configuration information of a resource for managing a license of data that the target M2M device creates, the validity of data usage of the target M2M device may be automatically verified.

Referring to FIG. 8, at step S801, the target M2M device may request data to the source M2M device. For example, the target M2M device may request the source M2M device to copy data of the source M2M device or may request exchange with data of the target M2M device. The target M2M device may create a resource for managing a license of data from the source M2M device.

At step S803, the source M2M device may request the target M2M device to retrieve a license for transferred data. After a predetermined time since the source M2M device transfers data, the source M2M device may make a license retrieval request in order to check whether or not the target M2M device uses the data correctly. The source M2M device may request attributes of a resource for managing a license of data to the target M2M device.

At step S805, the target M2M device may transmit a retrieval response message for the retrieval request to the source M2M device. The retrieval response message may include attributes of a resource for managing a license of data, which are attributes received from the source M2M device. The attributes included in the retrieval response message may include specifically ACK for a data source, usage eligibility of data, available operations of data, a data source link, and license information of data in the target M2M device.

At step S807, the source M2M device may verify the attributes about a data license of the target M2M device, which is included in the retrieval response message. Specifically, the source M2M device may check the correct data usage of the target M2M device by comparing an attribute about a license of source data and an attribute included in the retrieval response message.

When an attribute about a license obtained from the target M2M device is identical with a license attribute of data of the source M2M device, at step S809, the source M2M device may transfer data to the target M2M device. On the other hand, when the attribute about the license obtained from the target M2M device is not identical with the license attribute of data of the source M2M device, the source M2M device may stop a procedure of copying and/or exchanging data.

Figure 9:
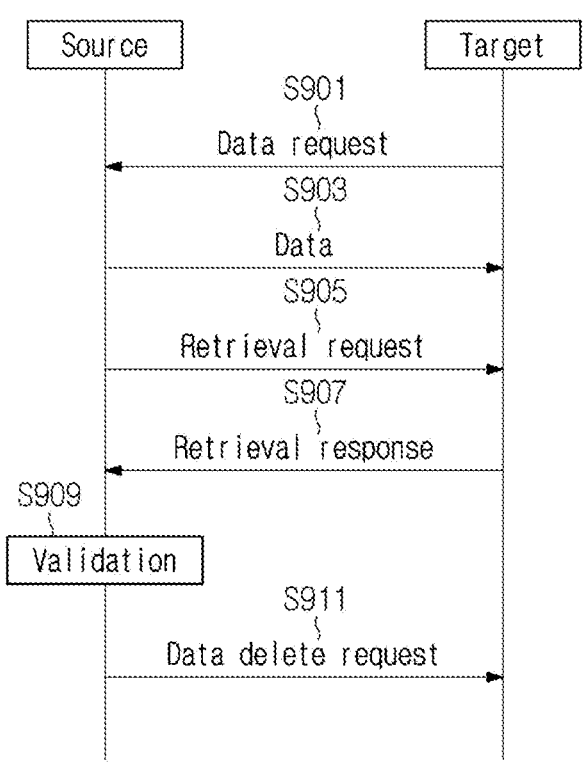
FIG. 9 is a flowchart illustrating a third embodiment of an operation of M2M devices which perform an operation for data based on an attribute related to a license.

FIG. 9 is a flowchart illustrating a third embodiment of an operation of M2M devices which perform an operation for data based on an attribute related to a license.

In an M2M network of FIG. 9, a source M2M device and a target M2M device may exchange data, and the target M2M device may create a resource for managing a license of data. The source M2M device may check whether or not the target M2M device uses correct data. In addition, by checking configuration information of a resource for managing a license of data that the target M2M device creates, the validity of data usage of the target M2M device may be automatically verified.

Referring to FIG. 9, at step S901, the target M2M device may request data to the source M2M device. For example, the target M2M device may request the source M2M device to copy data of the source M2M device or may request exchange with data of the target M2M device. The target M2M device may create a resource for managing a license of data from the source M2M device.

At step S903, the source M2M device may transfer data to the target M2M device. For example, the data transferred by the source M2M device may be data which is copied by the source M2M device. In addition, the source M2M device may transfer attributes associated with a license for data to the target M2M device. Herein, an attribute associated with a license for data may indicate information on a source of data, a license of data, usage eligibility of data, available operations of data and the like.

At step S905, the source M2M device may request the target M2M device to retrieve a license for transferred data. After a predetermined time since the source M2M device transfers data, the source M2M device may make a license retrieval request in order to check whether or not the target M2M device uses the data correctly. The source M2M device may request the target M2M device to provide attributes about a license of transferred data. Alternatively, the source M2M device may request attributes of a resource for managing a license of data to the target M2M device.

At step S907, the target M2M device may transmit a retrieval response message for the retrieval request to the source M2M device. The retrieval response message may include attributes about a license of data received from the source M2M device and/or attributes of a resource for managing a license of data. The attributes included in the retrieval response message may include specifically ACK for a data source, usage eligibility of data, available operations of data, a data source link, and license information of data in the target M2M device.

At step S909, the source M2M device may verify the attributes about a data license of the target M2M device, which is included in the retrieval response message. Specifically, the source M2M device may check whether or not the data usage of the target M2M device is correct, by comparing an attribute about a license of source data and an attribute included in the retrieval response message.

When an attribute about a license obtained from the target M2M device is not identical with a license attribute of data of the source M2M device, at step S911, the source M2M device may request the target M2M device to delete data. On the other hand, when the attribute about the license obtained from the target M2M device is identical with the license attribute of data of the source M2M device, the source M2M device may complete a data transfer procedure.

Figure 10:
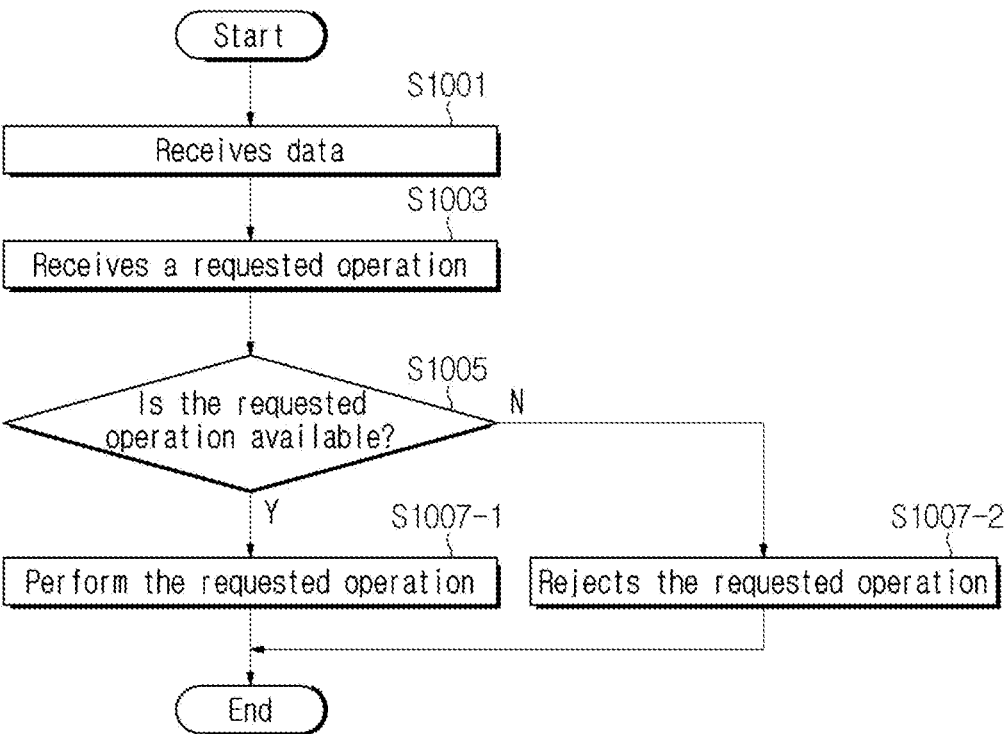
FIG. 10 is a flowchart illustrating an embodiment of an operation of M2M devices which perform an operation for data based on an attribute related to a license.

FIG. 10 is a flowchart illustrating an embodiment of an operation of M2M devices which perform an operation for data based on an attribute related to a license.

An application of an M2M device of FIG. 10 may perform an operation about data of the M2M device. Herein, the M2M device may perform the operation about data based on an attribute about a license of data.

Referring to FIG. 10, at step S1001, the M2M device may obtain data. Herein, the data may be data obtained from a counterpart M2M device. Alternatively, the data may be data stored in a database of the M2M device. Alternatively, the data may be data created by the M2M device. In addition, the data may include license-related attributes.

At step S1003, the M2M device may receive an operation request for data from the application. For example, the application may request the M2M device to perform at least one of operations (e.g., copy, publish, translate, adapt and distribute) indicated by a license.

At step S1005, the M2M device may determine whether or not the operation requested by the application is possible to perform, based on an attribute about a license of data. Specifically, the M2M device may determine whether or not the operation requested by the application is indicated by an attribute about an available operation for data.

When the operation requested by the application is indicated by the attribute about the license of data, at step S1007-1, the M2M device may perform the operation requested by the application. On the other hand, when the operation requested by the application is not indicated by the attribute about the license of data, at step S1007-2, the M2M device may not perform the operation requested by the application.

Accordingly, when the application wants to use data (e.g., copy data, share data, and the like), the M2M device may identify available operations for the data based on a license of the data and/or attributes about the license.

When the operation indicated by the application is not included in an available operation indicated by the attributes about the license, the M2M device may reject the request of the application.

Figure 11:
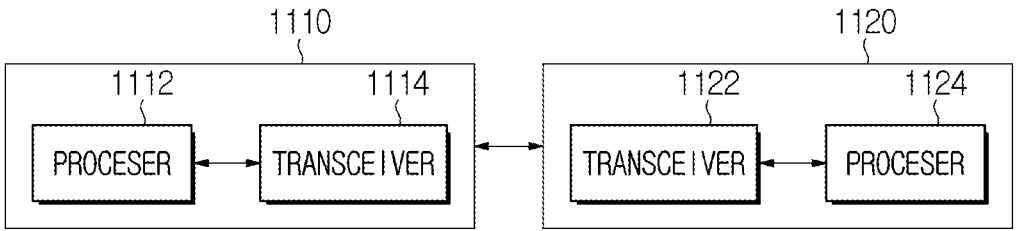
FIG. 11 illustrates a configuration of an M2M device in an M2M system according to the present disclosure.

FIG. 11 illustrates a configuration of an M2M device in an M2M system according to the present disclosure. An M2M device 1110 or an M2M device 1120 illustrated in FIG. 11 may be understood as hardware functioning as at least one among the above-described AE, CSE and NSE.

Referring to FIG. 11, the M2M device 1110 may include a processor 1112 controlling a device and a transceiver 1114 transmitting and receiving a signal. Herein, the processor 1112 may control the transceiver 1114. In addition, the M2M device 1110 may communicate with another M2M device 1120. The another M2M device 1120 may also include a processor 1122 and a transceiver 1124, and the processor 1122 and the transceiver 1124 may perform the same function as the processor 1112 and the transceiver 1114.

As an example, the originator, the receiver, AE and CSE, which are described above, may be one of the M2M devices 1110 and 1120 of FIG. 11, respectively. In addition, the devices 1110 and 1120 of FIG. 11 may be other devices. As an example, the devices 1110 and 1120 of FIG. 11 may be communication devices, vehicles, or base stations. That is, the devices 1110 and 1120 of FIG. 11 refer to devices capable of performing communication and are not limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both inventions may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. A method for operating a machine-to-machine (M2M) device in an M2M system, the method comprising:
   receiving data from a counterpart M2M device;
   receiving information on a license of the data from the counterpart M2M device; and
   performing a permitted operation for the data based on the received information on the license,
   wherein the received information on the license includes information indicating a license type of the data including a first license type and a second license type,
   wherein the first license type indicates a basic license of the data including distribution of the data,
   wherein the second license type indicates an extended license with additional conditions based on the first license type,
   wherein the second license type is classified into a plurality of license types based on the additional conditions, wherein the additional conditions include one or more conditions of a possibility of modifying the data or a possibility of commercial use of the data, wherein the permitted operation for the data is determined to include at least one of modifying, copying, publishing, translating, adapting, or distributing the data based on the received information indicating the license type, and wherein the method further comprises:

receiving, from the counterpart M2M device, a request for deleting the data according to a result of verifying the received information on the license.

2. The method of claim 1, further comprising:

receiving a retrieval request message for a license of data from the counterpart M2M device; and transmitting a retrieval response message for the retrieval request message, wherein the retrieval response message includes an ACK for the counterpart M2M device, which is a source of the data.

3. The method of claim 1, wherein performing the permitted operation for the data based on the information on the license comprises:

determining, based on the license type, whether an operation requested by an application in the M2M device is the permitted operation for the data;

performing the permitted operation for the data if the operation requested by the application in the M2M device is the permitted operation for the data; and ignoring the operation requested by the application if the operation requested by the application in the M2M device is not the permitted operation for the data.

4. The method of claim 1, wherein the information on the license further includes information indicating a creator of the data and information indicating an owner of the data, and wherein the information indicating the owner of the data is modified to indicate that the owner of the data is the M2M device.

5. The method of claim 1, wherein verifying the received information on the license is performed by the counterpart M2M device.

6. A machine-to-machine (M2M) device in an M2M system, the M2M device comprising:

a transceiver configured to transmit and receive a signal; and a processor configured to control the transceiver, wherein the processor is further configured to:

receive data from a counterpart M2M device, receive information on a license of the data from the counterpart M2M device, and perform a permitted operation for the data based on the received information on the license, wherein the received information on the license includes information indicating a license type of the data including a first license type and a second license type, wherein the first license type indicates a basic license of the data including distribution of the data, wherein the second license type indicates an extended license with additional conditions based on the first license type, wherein the second license type is classified into a plurality of license types based on the additional conditions, wherein the additional conditions include one or more conditions of a possibility of modifying the data or a possibility of commercial use of the data, wherein the permitted operation for the data is determined to include at least one of modifying, copying, publishing, translating, adapting, or distributing the data based on the received information indicating the license type, and wherein the processor is further configured to receive, from the counterpart M2M device, a request for deleting the data according to a result of verifying the received information on the license.

7. The M2M device of claim 6, wherein the processor is further configured to:

receive a retrieval request message for a license of data from the counterpart M2M device; and transmit a retrieval response message for the retrieval request message, wherein the retrieval response message includes license information of the received data in the M2M device.

8. The M2M device of claim 6, wherein the processor is further configured to:

determine, based on the license type, whether an operation requested by an application in the M2M device is the permitted operation for the data;

perform the permitted operation for the data if the operation requested by the application in the M2M device is the permitted operation for the data; and ignore the operation requested by the application if the operation requested by the application in the M2M device is not the permitted operation for the data.

9. The M2M device of claim 6, wherein the information on the license further includes information indicating a creator of the data and information indicating an owner of the data, and wherein the information indicating the owner of the data is modified to indicate that the owner of the data is the M2M device.

10. The M2M device of claim 6, wherein verifying the received information on the license is performed by the counterpart M2M device.

* * * * *